April 1, 1941.  E. C. BOOTH  2,236,889
AUTOMOBILE HEATING SYSTEM
Filed June 9, 1938
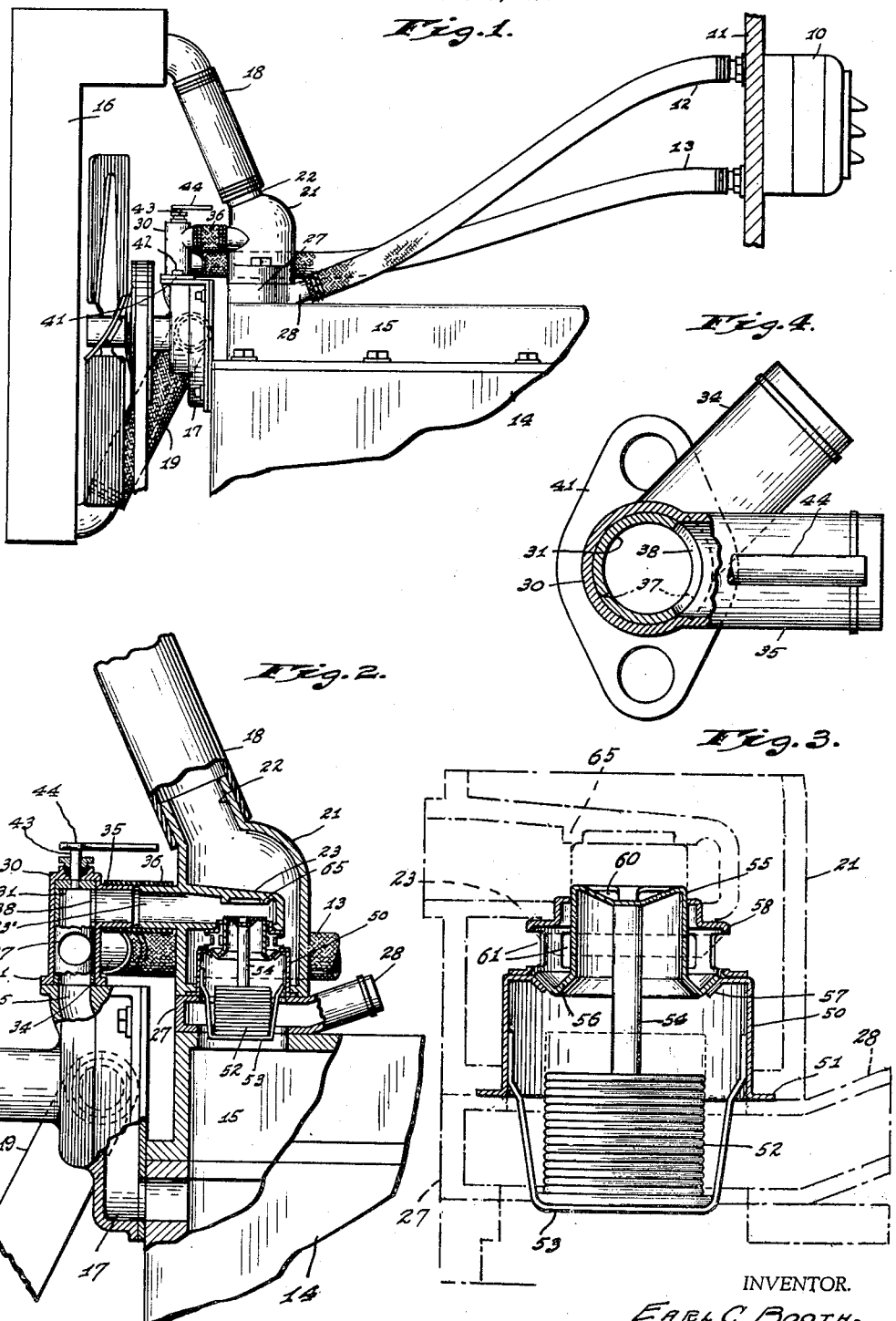
INVENTOR.
EARL C. BOOTH,
BY
ATTORNEYS.

Patented Apr. 1, 1941

2,236,889

UNITED STATES PATENT OFFICE 2,236,889

AUTOMOBILE HEATING SYSTEM

Earl C. Booth, Columbus, Ind., assignor to Noblitt-Sparks Industries, Inc., Columbus, Ind., a corporation of Indiana Application June 9, 1938, Serial No. 212,646

7 Claims. (Cl. 237—12.3)

This invention relates to systems employed in heating automobile-bodies and specifically to a system in which heat is derived from the water employed to cool the automobile engine. It is the object of the invention to produce a system in which the water supplied to the heater will be maintained at an effectively high temperature and in which, at the same time, excessively high pressures and stagnation of water within the water-jacket of the engine will be prevented when flow of water to the automobile-body heater is shut off. A further object of my invention is to produce a system accomplishing the above results and readily capable of installation in an automobile of standard construction.

In carrying out my invention, I provide three paths for the circulating engine-cooling water, such paths having a portion which is common to all three and which includes the water-jacket of the engine and the water-circulating pump. The first of these paths includes the conventional automobile radiator while the second includes the heat-exchanging core of a heater mounted within the automobile body. The third path or by-pass is desirably short and contains nothing in the way of a heat-radiating element. In the first path I place a valve responsive to the temperature of water in the engine water-jacket and operative when closed to prevent flow through the radiator and to compel water discharged from the water-jacket to flow over one of the other two paths; and in association with such other two paths, I provide valve means, preferably a three-way valve, by which either may be closed.

The accompanying drawing illustrates my invention. Fig. 1 is a side elevation of the heating system showing the heater within the car body, a portion of the automobile engine, and the connections by which the water-jacket of the engine is connected with the heater and radiator; Fig. 2 is a fragmental view similar to Fig. 1 but on an enlarged scale and with parts of the system broken away; Fig. 3 is an axial section through the temperature-responsive valve showing in chain lines the parts with which that valve is directly associated; and Fig. 4 is a horizontal section through the three-way valve.

The system illustrated in Fig. 1 includes an automobile-body heater 10 conveniently mounted on the rear face of the dash 11. I have not shown any details of the heater, as heaters of suitable construction are common. The heater 10 is connected by a supply conduit 12 and a return conduit 13 into the water-circulating system of the engine 14 so that water heated by its passage through the water-jacket 15 of the engine may circulate through the heater 10.

The water-circulating system of the engine, in addition to the water-jacket 15, includes a radiator 16 and a pump 17. The pump 17 discharges into the water-jacket of the engine 14 as indicated in Fig. 2, and water discharged from the water-jacket flows through a conduit 18 to the top of the radiator 16 from which it is returned to the pump 17 through a conduit 19.

In the particular embodiment of my invention illustrated in the drawing, the connection between the water-jacket 15 and the conduit 18 is by way of a fitting 21 provided with a nipple 22 receivable within the lower end of the conduit 18. Extending laterally into the interior of the fitting 21 is a hollow projection 23 the interior of which communicates with a nipple 23' on the side of the fitting.

Within the fitting 21 there is mounted a thermostatic valve which will be described in detail hereinafter and which serves to divide between the outlets 22 and 23' all water entering the fitting from the water-jacket. Water discharged through the outlet 22 passes through the radiator 16 to be cooled and is then returned through conduit 19 to the main inlet of the pump 17. Water discharged through the outlet 23', however, is conducted directly to an auxiliary pump-inlet opening 25, does not pass through the radiator, and therefore is subjected to no cooling action.

In incorporating the heating system in association with the parts so far described, I may interpose between the fitting 21 and the wall of the water-jacket 15 a spacing member 27 which has a hollow interior communicating with the water-jacket 15, with the interior of the fitting 21, and with a nipple 28 connected to the supply conduit 12 of the heater 10. In association with the auxiliary pump inlet 25 I may provide a three-way valve comprising a housing 30 for a rotatable valve-element 31 having a hollow interior which opens into the auxiliary pump inlet 25. At spaced points along the axis of the valve-housing 30, I provide laterally projecting nipples 34 and 35, the former received within the forward end of the conduit 13 which conveys water from the heater 10 and the latter being connected to the fitting-outlet 23' as by a short hose 36. The rotary valve element 31 is provided in its wall with axially spaced openings 37 and 38 located respectively in the transverse planes of the nipples 34 and 35 and so angularly spaced that by rotation of the valve element 31 either of the nipples 34 and 35 may be brought into communication with the interior of the valve and thence with the auxiliary pump inlet 25.

The valve housing 30 may be provided at its lower end with a flange 41 by which the housing may be attached to the pump 17 through the medium of screws 42. A stem 43 secured to the valve member 31 extends upwardly through a stuffing box and is provided with an operating handle 44 by which the valve member 31 may be adjusted.

The thermostatic valve previously referred to may comprise a cylindrical housing 50 provided at its lower end with an out-turned annular flange 51 that can be received in a counterbored recess in the fitting 21. A temperature-responsive element, here shown as an expansible bellows 52, is supported at one end from the housing 50, as through the medium of a stirrup 53. Connected to the upper or movable end of the temperature-responsive element 52 is an upwardly extending stem 54 which carries a valve member 55 in the form of an inverted cup. The valve member 55 has at its lower end an outwardly directed annular flange 56 which is movable vertically into and out of engagement with a complementary flange 57 on the housing 50.

The upper end of the valve member 55 is supported for vertical sliding movement within a housing-extension 58 the upper portion of which is formed to fit within an opening in the lower wall of the projection 23. The end wall of the valve 55 is provided with openings 60 and the side wall of the housing-extension 58 with openings 61.

The thermostatically-controlled valve is shown in Fig. 3 in the condition existing when the water within the water-jacket 15 is cold. In such circumstances, the flange 56 of the valve member 55 is seated upon the flange 57 of the housing 50, thus preventing discharge of water from the housing 50 except by way of the holes 60 and the interior of the projection 23. If the valve member 31 is adjusted to the position indicated in Figs. 2 and 4, water escaping through the openings 60 passes through the interior of the projection 23 into the nipple 35 and thence through the interior of the valve member 31 to the auxiliary pump-inlet 25. However, if the valve member 31 is adjusted to bring the opening 37 into alinement with the nipple 34 and the opening 38 out of alinement with the opening 35, the water passing from the water-jacket 15 can not escape through the openings 60 but instead is diverted through the nipple 28 and hose 12 to the heater 10, from which it is returned through the hose 13 and nipple 34 to the interior of the valve member 31 and thence to the auxiliary pump-inlet 25.

Thus, as long as the water within the water-jacket 15 remains comparatively cool, none of it passes through the radiator 16, with the result that the temperature of the water rapidly rises. After the water-temperature has reached a predetermined point, the temperature-responsive element 52 expands to lift the valve member 55. This separates the flanges 56 and 57 and permits some water to escape through the openings 61 into the interior of the fitting 21, and thence through the conduit 18, into the radiator. That portion of the water which follows the path just mentioned is cooled by passage through the radiator, and thus over-heating of the engine is prevented. When the temperature-responsive element 52 is fully expanded, the upper end of the valve 55 engages a suitable seat 65 on the upper wall of the projection 23 to prevent any further escape of water through the openings 60. If the valve 31 is adjusted as indicated in Figs. 2 and 4, seating of the upper end of the valve 55 against the seat 65 will cause all the water circulated by the pump 17 to flow through the radiator; or, if the valve 31 is adjusted to connect the conduit 13 with the auxiliary pump-inlet 25, the water discharged from the engine jacket will be divided between the radiator 16 and the heater 10.

The system described has the advantage that it is easily incorporated in automobiles of standard construction, and the additional advantage that whether the path through the heater 10 is open or closed circulation of the cooling fluid is always possible, thus preventing stagnation of the cooling fluid and the creation of excessively high pressures within the water-jacket. The fitting 21 and the associated temperature-responsive valve are standard equipment on some makes of automobiles, the fittings being mounted directly on top of the engine water-jacket and the nipple 23' being directly connected to the auxiliary pump-inlet 25. To adapt such an arrangement for association with a heater requires only the provision of the spacing member 27 and the three-way valve 30.

I claim as my invention:

1. In combination with the engine water-jacket and radiator of an automobile, a pump having its inlet connected to said radiator and its outlet to said water-jacket, a main conduit for conveying water from the outlet of said water jacket to said radiator, an automobile-body heater having water-supply and water-return conduits, said water-supply conduit being connected to the outlet of said water-jacket, a by-pass conduit connected to the outlet of said water-jacket, a three-way valve for alternatively connecting the inlet of said pump either to said by-pass conduit or to said water-return conduit, and temperature-responsive valve means for simultaneously closing said by-pass conduit and opening said main conduit, said valve means being responsive to the temperature of water in said water-jacket.

2. In combination with the engine water-jacket and radiator of an automobile, a pump having its inlet connected to said radiator and its outlet to said water-jacket, a main conduit for conveying water from the outlet of said water jacket to said radiator, an automobile-body heater having water-supply and water-return conduits, said water-supply conduit being connected to said water-jacket, a by-pass conduit connected to the outlet of said water-jacket, valve means for alternatively connecting the inlet of said pump either to said by-pass conduit or to said water-return conduit, and temperature-responsive valve means for simultaneously closing said by-pass conduit and opening said main conduit, said valve means being responsive to the temperature of water in said water-jacket.

3. In combination with an automobile-engine cooling system comprising an engine water-jacket, a pump, a radiator, and connections connecting such elements into a circulatory system; an automobile-body heater, water-supply and water discharge conduits for said heater connected to said circulatory system to form with said heater a by-pass for said radiator, a second by-pass for said radiator, valve means associated with said water-discharge conduit and for alternatively opening either of said by-passes and simultaneously closing the other, and temperature-responsive valve means operative when closed to prevent flow of water to said radiator, said valve means being responsive to the temperature of water in said water-jacket and operating to close said second by-pass as it opens to permit flow of water to said radiator.

4. In combination with an automobile-engine cooling system comprising an engine water-jacket, a pump, a radiator, and connections connecting such elements into a circulatory system; an automobile-body heater, water-supply and water-discharge conduits for said heater connected to said circulatory system to form with said heater a by-pass for said radiator, a second by-pass for said radiator, valve means associated with said water-discharge conduit and for alternatively opening either of said by-passes, and temperature-responsive valve means operative when closed to prevent flow of water to said radiator, said valve means being responsive to the temperature of water in said water-jacket and operating to close said second by-pass as it opens to permit flow of water to said radiator.

5. In combination with the engine water-jacket and radiator of an automobile, a pump having its inlet connected to said radiator and its outlet to said water-jacket, a main conduit for conveying water from the outlet of said water-jacket to said radiator, an automobile-body heater having water-supply and water-return conduits, said water-supply conduit being connected to said water-jacket, a by-pass conduit connected to the outlet of said water-jacket, valve means associated with said water-return conduit for alternatively permitting flow either through said heater or through said by-pass, and temperature-responsive valve means for simultaneously closing said by-pass conduit and opening said main conduit, said valve means being responsive to the temperature of water in said water-jacket.

6. In combination with the engine water-jacket and radiator of an automobile, said water-jacket having an outlet opening in its upper wall, a flat spacing member disposed upon said water-jacket and having through it a passage alined with the outlet opening of the water-jacket, a housing disposed upon said spacing member and having at its lower end an inlet opening communicating with the passage therein, said housing having a main outlet connected to said radiator and an auxiliary outlet, temperature-responsive valve means including a movable valve member within said housing and responsive to the temperature of water in said water-jacket for preventing escape of water through said main outlet, an automobile-body heater, water-supply and water-return conduits therefor, a pump having its inlet connected to said radiator and its outlet connected to said water jacket, and means including a valve for alternatively connecting the inlet of said pump either to the auxiliary outlet of said housing or to said water-return conduit, said spacing member being provided with a lateral outlet to which said water-supply conduit is connected.

7. In combination with the engine water-jacket and radiator of an automobile, a housing disposed to receive water from said water-jacket, said housing having an outlet connected to said radiator, a temperature responsive valve for preventing escape of water through said outlet, said valve being responsive to the temperature of water in said water-jacket, a hollow spacing member interposed between said water-jacket and said housing and communicating with both, an automobile-body heater, water-supply and water-return conduits therefor, a pump having its inlet connected to said radiator and its outlet connected to said water-jacket, said water-supply conduit being connected to the interior of said spacing member, said housing having an auxiliary outlet opening, a three-way valve housing mounted upon said pump and having three ports connected respectively to said auxiliary outlet opening, to said water-return conduit, and to the inlet of said pump, and a movable manually controlled valve-member mounted within said three-way valve housing for alternatively connecting either of said first two ports to the third port.

EARL C. BOOTH.